(12) United States Patent
Atluri et al.

(10) Patent No.: US 7,400,067 B2
(45) Date of Patent: Jul. 15, 2008

(54) OPERATION OF A REDUNDANT POWER SUPPLY WITHOUT ISOLATION DEVICES

(75) Inventors: Prasad R. Atluri, Houston, TX (US); Hai N. Nguyen, Spring, TX (US); Reynaldo P. Domingo, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 243 days.

(21) Appl. No.: 11/264,244

(22) Filed: Oct. 31, 2005

(65) Prior Publication Data

US 2007/0096563 A1    May 3, 2007

(51) Int. Cl.
    *H02J 1/00*    (2006.01)
(52) U.S. Cl. .................................. 307/85
(58) Field of Classification Search .......... 307/85
    See application file for complete search history.

(56) References Cited

U.S. PATENT DOCUMENTS

| | | | |
|---|---|---|---|
| 5,636,114 A | 6/1997 | Bhagwat et al. | |
| 5,703,458 A * | 12/1997 | Gershen et al. | 318/799 |
| 5,875,103 A | 2/1999 | Bhagwat et al. | |
| 6,008,630 A | 12/1999 | Prasad | |
| 6,301,133 B1 * | 10/2001 | Cuadra et al. | 363/65 |
| 6,735,097 B1 | 5/2004 | Prasad et al. | |
| 6,738,274 B2 | 5/2004 | Prasad et al. | |
| 2005/0141158 A1 | 6/2005 | Sae-Ueng et al. | |
| 2006/0226705 A1 * | 10/2006 | Atluri et al. | 307/51 |

OTHER PUBLICATIONS

Jim Bird, Texas Instruments, "Managing Power in HA Gateway Designs," Feb. 17, 2004, 7 pp., [Online] http://www.commsdesign.com/printableArticle/;jsessionid=X2T53QX4IQ3EIQSNDBCS ....
Goran Perica, Linear Technology, "Overvoltage-protection circuit saves the day," Nov. 14, 2002, pp. 93-96, [Online] www.edn.com.
Dallas Semiconductor Maxim, "MAX1917 Provides Pre-Bias Soft Start for Redundant Supply," Sep. 21, 2004, 3 pp.
Electronicstalk Editorial Team, "Decoupling diode avoids dangers of redundancy," Sep. 8, 2003, 3 pp.
SSI, "A Server System Infrastructure (SSI) Specification for Pedestal Chassis Power Supplies," ERP12V (Entry Redundant Power) Power Supply Design Guide, 30 pp.
David Soo, "Protecting and Monitoring Hot Swappable Cards in High Availability Systems-Design Note 360," Linear Technology, 03/05/360, 2 pp.
Jim Bird, Texas Instruments, "Controller makes power supply redundancy easy," Jan. 5, 2004, 7 pp.

\* cited by examiner

*Primary Examiner*—Robert L. DeBeradinis

(57) ABSTRACT

Methods and apparatuses are disclosed that may allow elimination of isolation devices for redundant power supplies while mitigating the undesirable effects of their elimination.

23 Claims, 6 Drawing Sheets

OPERATION OF A REDUNDANT POWER SUPPLY WITHOUT ISOLATION DEVICES

BACKGROUND

Computers and other electronic systems are ubiquitous in society, and as a result, their reliability has become increasingly important. One method of providing reliability for computers and other electrical systems is to implement redundant power supplies. As the name implies, redundant power supplies offer an alternative power supply if a first power supply becomes unavailable. Each individual power supply is usually capable of providing all the required power of a computer system, and the multiple power supplies usually provide redundancy by being coupled to a common voltage bus. Although these multiple devices may couple to a common voltage bus, they often include isolation devices so that failure of one of the power supplies does not affect the other power supplies or the voltage bus.

BRIEF DESCRIPTION OF THE DRAWINGS

For a detailed description of exemplary embodiments of the invention, reference will now be made to the accompanying drawings in which the reference numerals may be used to refer to the same components in the multiple figures.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In an effort to reduce power consumption, improve efficiency and reliability, as well as decrease system cost, power supply designers are actively engaged in reducing or eliminating the number of subcomponents contained in these redundant power supplies. Eliminating subcomponents, however, can have detrimental effects. Specifically, the elimination of isolation devices may cause the redundant power supplies to undesirably affect the power delivery of the other power supplies that are coupled to the voltage bus. Further, eliminating isolation devices may make it difficult to distinguish which power supply, among the many that may be part of a redundant power supply, has failed.

Methods and apparatuses are disclosed that may allow elimination of isolation devices for redundant power supplies while mitigating the undesirable effects of their elimination. While the thrust of this discussion pertains to redundant power supplies for computer systems, one of ordinary skill in the art will appreciate that any electrical system capable of implementing redundant power is also capable of implementing the disclosed embodiments. For example, the disclosed embodiments may find application in medical instrumentation, navigation equipment, and telecommunication applications.

Figure 1:
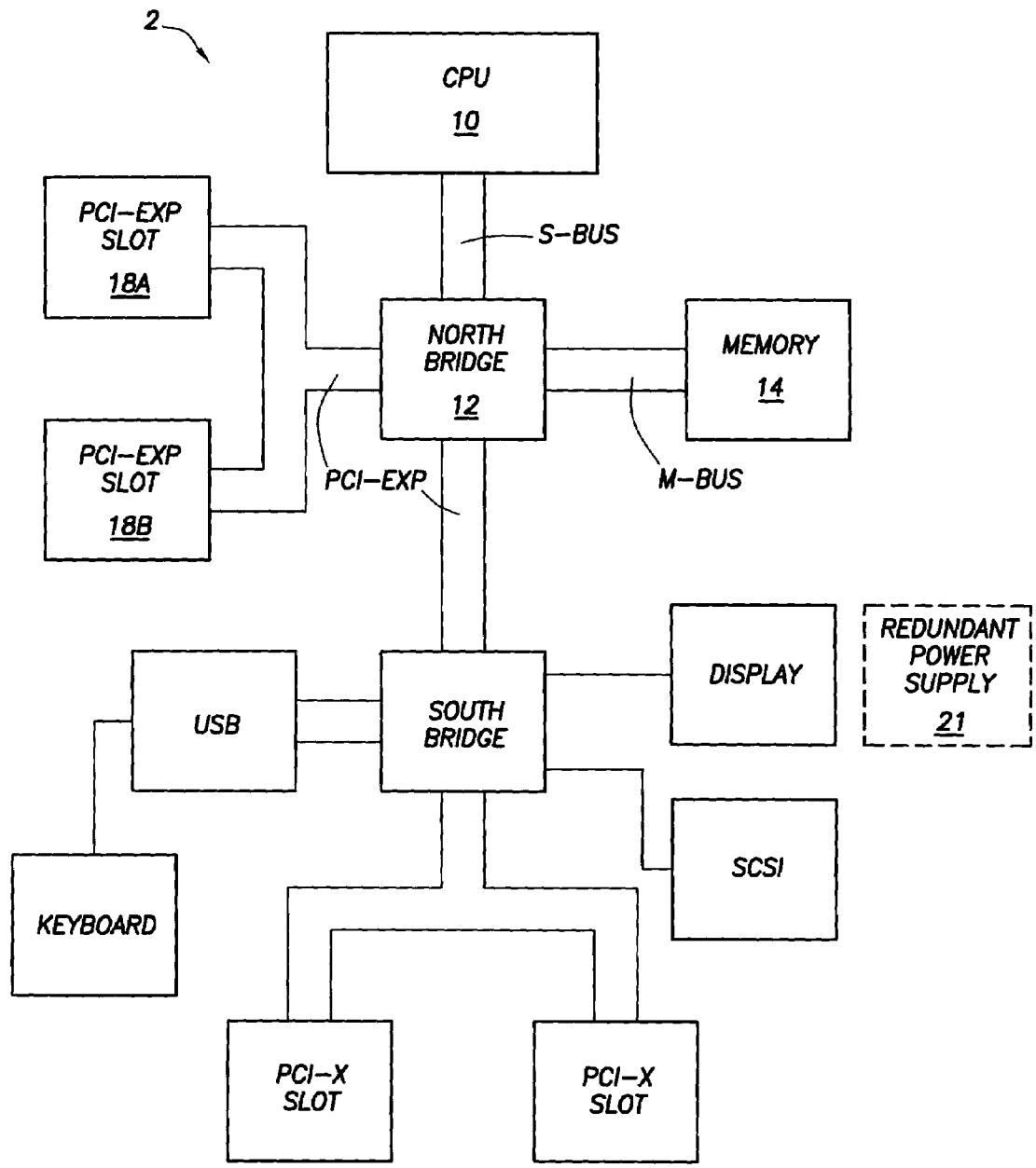
FIG. 1 depicts a computer system according to the various embodiments.

Referring now to FIG. 1 a block diagram of an exemplary computer system 2 is illustrated. Computer system 2 includes a central processing unit (CPU) 10 that couples to a bridge logic device 12 via a system bus (S-BUS). Bridge logic device 12 may be referred to as a "North bridge." In some embodiments, bridge 12 couples to a memory 14 by a memory bus (M-BUS). In other embodiments, however, CPU 10 includes an integrated memory controller, and memory 14 connects directly to CPU 10.

Bridge 12 also couples to PCI-Express® slots 18A-B using the PCI-Express® bus standard as disclosed in "PCI-Express Base Specification 1.0a," available from the Peripheral Component Interconnect (PCI) Special Interest Group (PCI-SIG) and incorporated herein by reference. Slots 18A-B may physically reside on the same printed circuit board (also referred to as a "system board" or "mother board") as CPU 10. Regardless of the actual implementation of computer system 2, a redundant power supply 21 also may be provided in order to maintain an uninterrupted source of power during operation.

Figure 2:
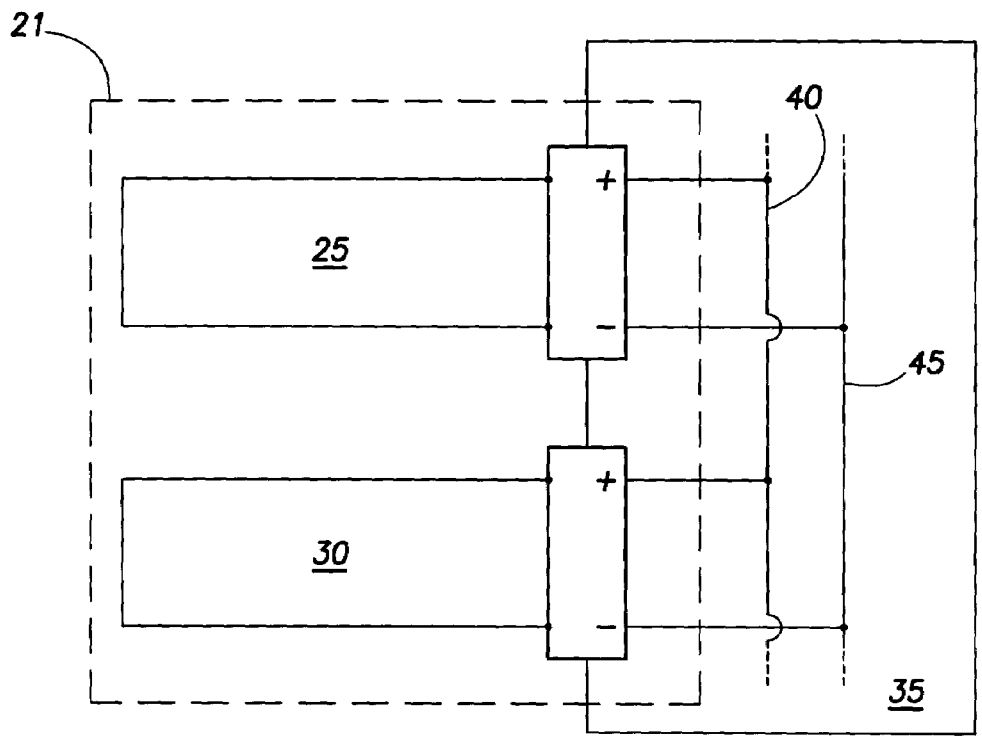
FIG. 2 depicts a redundant power supply according to the various embodiments.

FIG. 2 represents an exemplary block diagram of redundant power supply 21 including several individual power supplies 25 and 30. Although the embodiment depicted in FIG. 2 shows two individual power supplies 25 and 30, one of ordinary skill in the art would appreciate that many individual power supplies are possible. As is illustrated, power supplies 25 and 30 couple to a system board 35, which may house one or more of the components of computer system 2 (shown in FIG. 1). While computer system 2 is operating, power supplies 25 and 30 may be physically inserted into or removed from system board 35. This capability is often referred to as "hot plugging" or "hot swapping." For example, if power supply 25 fails, it may be hot swapped with a replacement power supply while power supply 30 handles the power requirements for computer system 2. In this manner, each swappable power supply is capable of handling the power requirements for the entire computer system.

Each power supply provides positive and negative voltage outputs (indicated by the "+" and "−" signs respectively), which couple to positive and negative voltage busses 40 and 45 respectively. For ease of discussion, negative bus 45 will hereinafter be referred to as a ground bus, because the ground bus is usually the most negative bus in the system. In some embodiments, however, the outputs of each power supply provides a voltage that is greater than ground on the positive output on a voltage that is less than ground on its negative output.

Voltage bus 40 and ground bus 45 provide power for system board 35. Since each power supply is coupled to common busses 40 and 45 the condition and presence of each power supply 25 and 30 may impact the delivery of power to system board 35. For example, if power supply 25 fails and its positive and ground outputs are shorted together, this may short the positive and ground busses 40 and 45 together, which may cause interruption of power delivery to system board 35 and affect other devices in computer system 2.

Additionally, if a failed power supply is being replaced with a new power supply, the new power supply will initially be uncharged (i.e., 0 volts between its positive and ground output terminals) and may charge itself by draining current from other power supplies that are coupled to busses 40 and 45. Hence, redundant power supplies, such as power supply 21, traditionally require isolation devices.

Isolation devices often include diodes and transistors that logically "OR" the positive and ground busses 40 and 45 together. Regardless of whether a diode OR-ing arrangement is used for isolation or a transistor isolation arrangement is used for isolation, both the diodes and the transistors consume a portion of the power that is delivered to busses 40 and 45. More particularly, in the case of diodes, each diode has a fixed forward bias voltage drop across it so that the amount of power consumed by the diode is based on the amount of current flowing through it. Therefore, the power consumption of each isolation diode increases as the power delivered increases, which decreases the overall efficiency of the power supplies. Isolation transistors also consume a portion of the power they are delivering, albeit to a lesser extent.

While isolation transistors offer the advantage of consuming less power than isolation diodes, detecting which power supply from among the many that may be coupled to voltage bus is the faulty power supply becomes more difficult as the voltage across the isolation devices decreases.

Ideally, reducing this voltage to zero would provide minimal power consumption. This situation is depicted in FIG. 2 where no isolation devices are present. As mentioned above, in this arrangement, if either power supply 25 or 30 fails and shorts its positive and ground terminals together, then busses 40 and 45 may be shorted together. Regardless of whether power supply 25 is faulty or power supply 30 is faulty, with the isolation devices eliminated, monitoring circuitry (not shown in FIG. 2) that monitors the positive and ground terminals of a power supply may be unable to determine if the fault occurred in power supply 25 or power supply 30.

Also, in the complete elimination arrangement shown in FIG. 2, one of the power supplies may experience an "over voltage" condition where the power supply generates an output voltage that is too high. Such an over voltage situation may make it difficult to determine which power supply 25 or 30 is generating excessive voltage because they are commonly coupled to busses 40 and 45. For example, if power supply 25 is generating an output voltage that is too high, it may be difficult for the internal detection circuitry of power supply 30 (not shown in FIG. 2) to distinguish if the over voltage condition is because of power supply 30 or power supply 25.

Figure 3B:
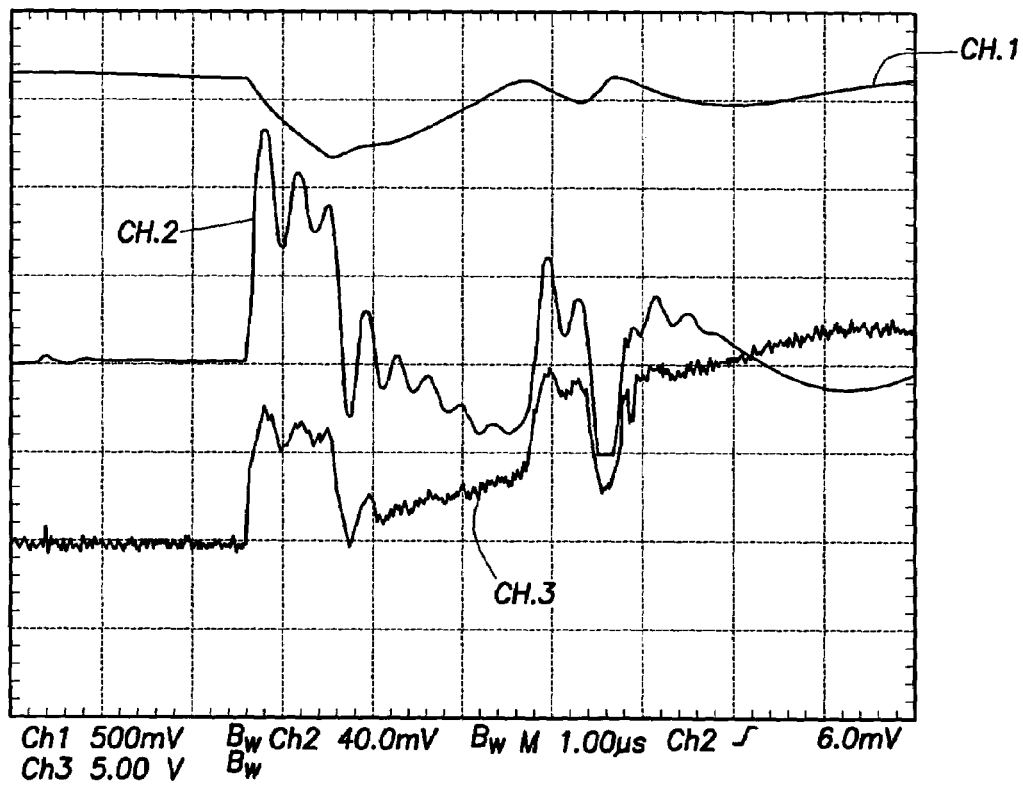
FIG. 3B depicts experimental results from a power supply according to the various embodiments.
Figure 3A:
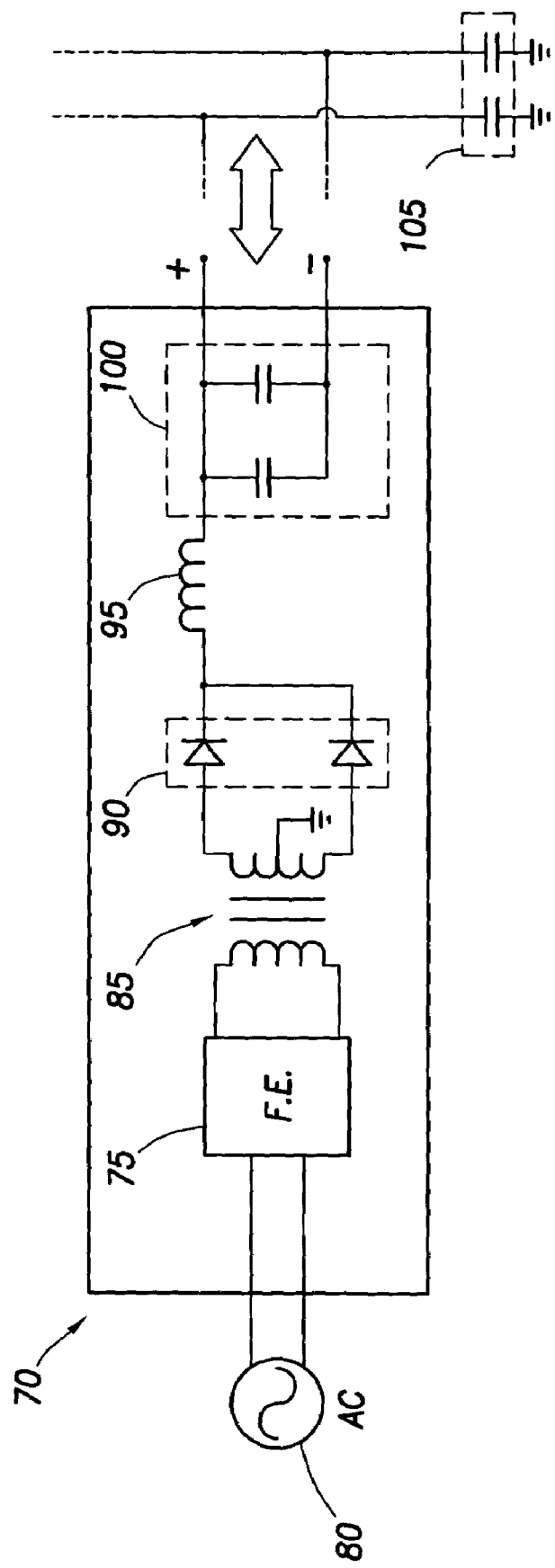
FIG. 3A depicts a power supply according to the various embodiments.
Figure 3C:
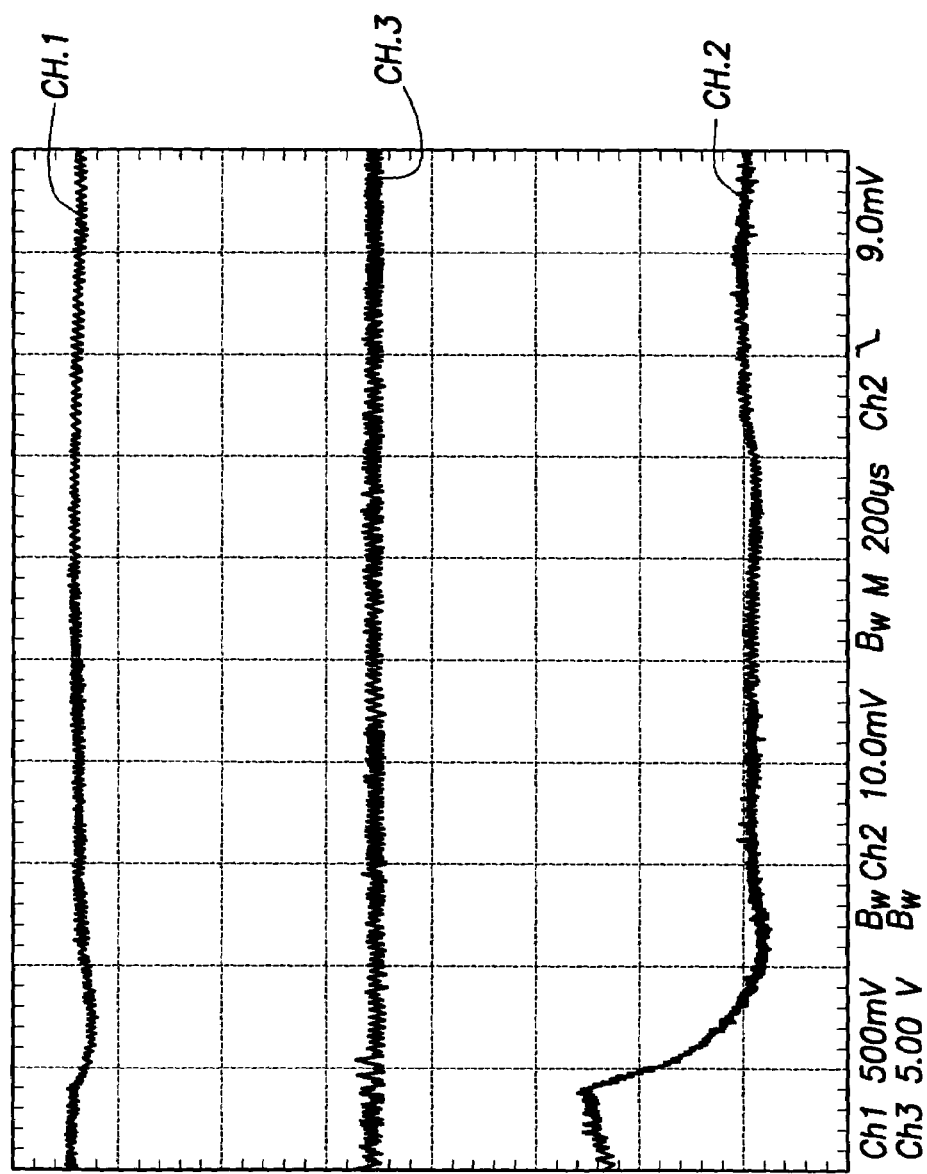
FIG. 3C depicts experimental results from a power supply according to the various embodiments.
Figure 4:
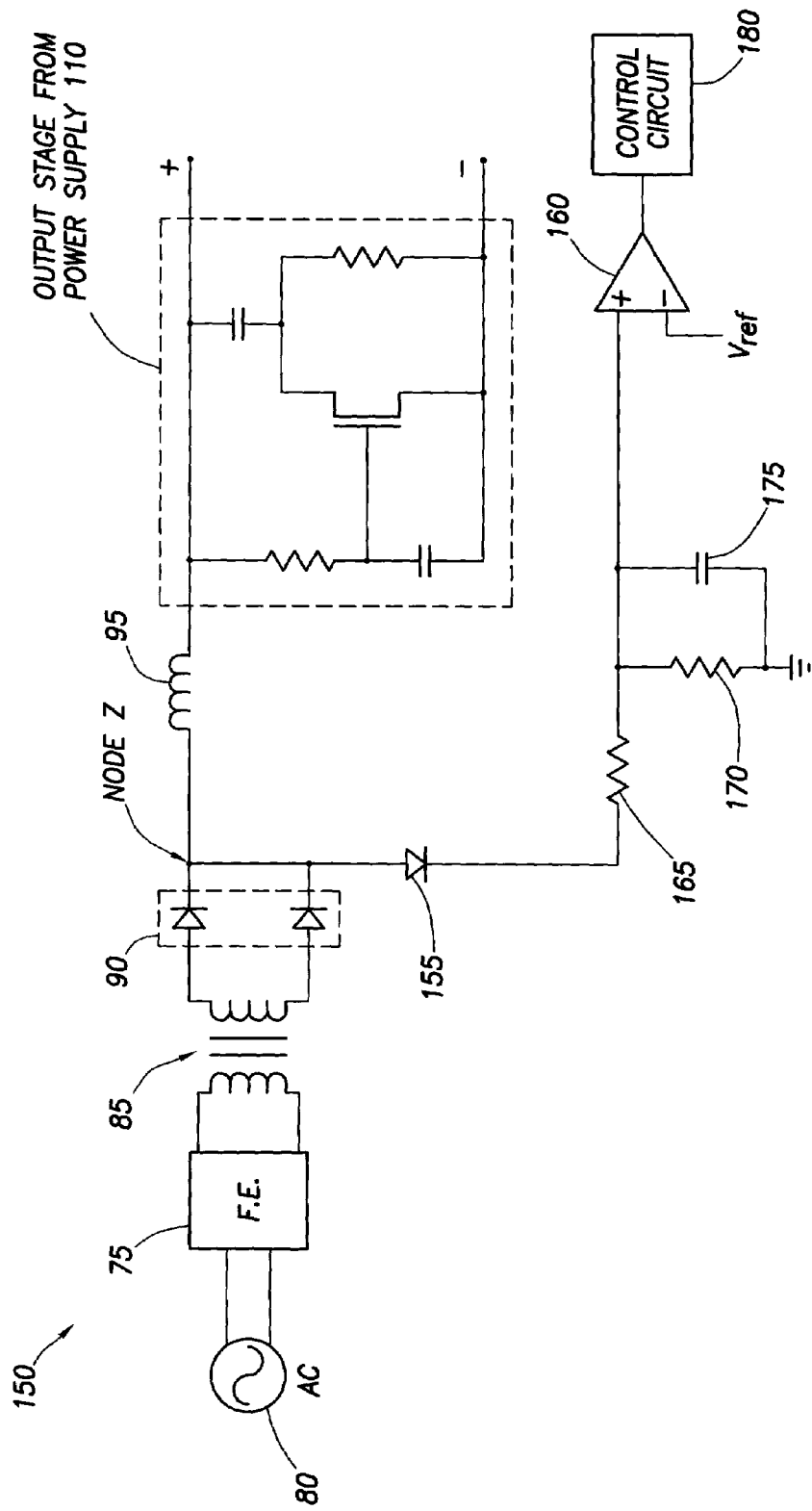
FIG. 4 depicts still another power supply according to the various embodiments.
Figure 5:
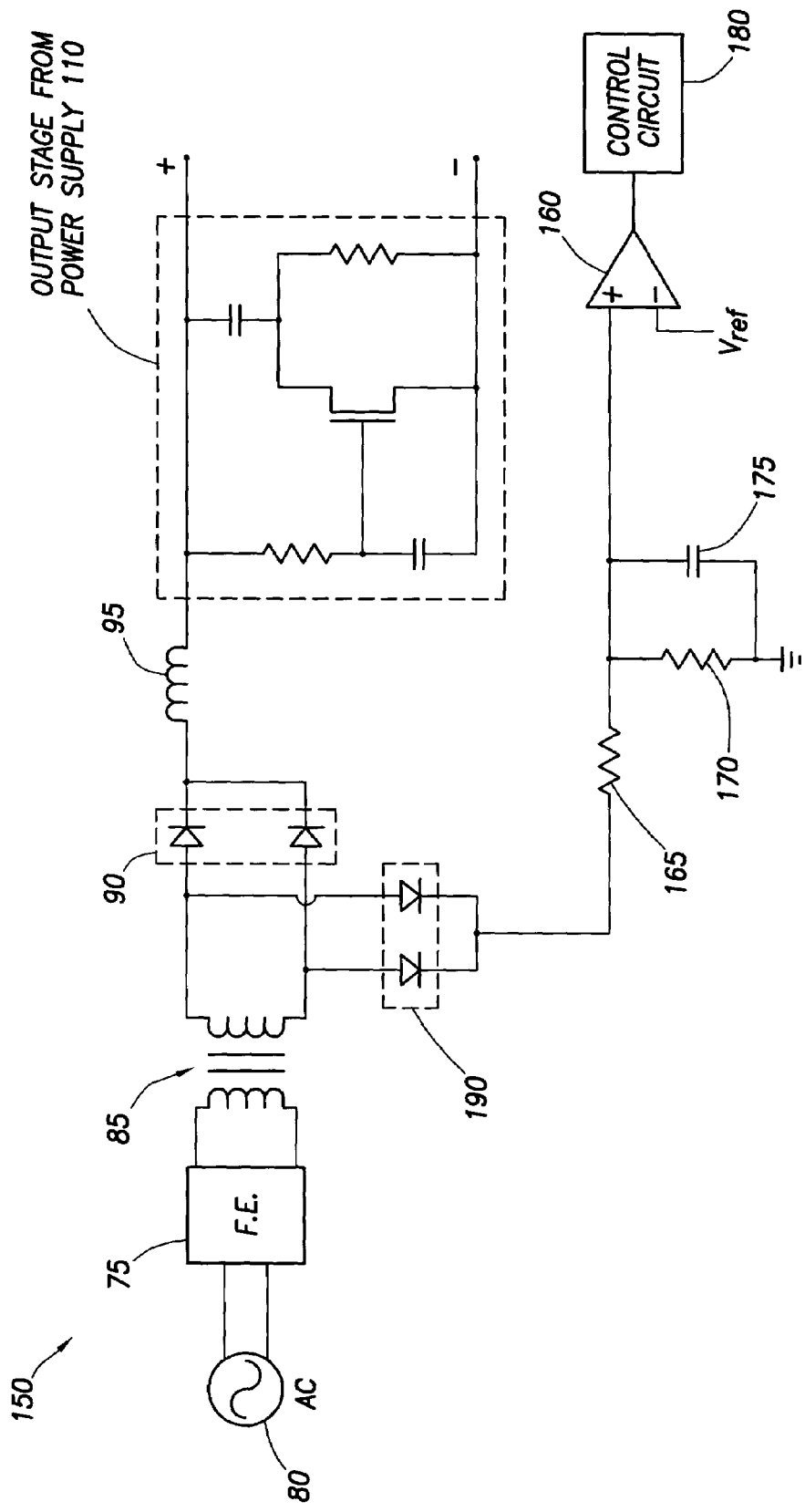
FIG. 5 depicts still another power supply according to the various embodiments.

FIGS. 3-5 illustrate methods and apparatuses that may allow elimination of isolation devices (such as diodes or transistors) in redundant power supply arrangements while mitigating the undesirable effects of their elimination.

Referring to FIG. 3A, a removable power supply 70 according to one embodiment is illustrated. In some embodiments, power supply 70 may mitigate undesirable effects that result from eliminating the isolation devices in a redundant power system (such as excessive current draw during hot swapping). Power supply 70 may function as one of many power supplies within a redundant power supply system 20 (shown in FIG. 2). In this manner, power supply 70 may be hot swapped into and out of a computer system such as computer system 2 (shown in FIG. 1). Thus, power supply 70 is capable of handling the entire power requirements for computer system 2.

Power supply 70 includes front end circuitry 75 that is coupled to an AC source 80. As would be appreciated by one of ordinary skill in the art, front end circuitry 75 may include electromagnetic interference filters, diode rectifiers, and power factor correction, filtering circuitry and primary switching circuitry (none of which is shown in FIG. 3A). Front end circuitry 75 may be coupled to a high frequency transformer 85 that isolates high voltage from the power delivered at the positive and ground terminals. Transformer 85 is coupled to the anode connection of diodes 90. One of ordinary skill in the art will appreciate that transformer 85 and rectifying diodes 90 may provide further rectification of the output voltage to an inductor 95 that is coupled to the cathode connection of rectifying diodes 90.

An internal capacitance 100 is coupled between the output terminals of power supply 70 and the inductor 95. In addition, an external bus capacitance 105 is coupled to busses 40 and 45 respectively. Although no isolation device (such as diodes or transistors) is necessary to couple power supply 70 to busses 40 and 45, capacitances 100 and 105 may assist in mitigating undesired effects resulting from removing the isolation devices. The total value of capacitances 100 and 105 is determined from the specification for the maximum voltage ripple on busses 40 and 45. For example, if busses 40 and 45 deliver 12 volts, and the current delivered by power supply 70 is around 80 amps, then the maximum ripple specification may require about 2 mF of total capacitance. With this total value known, capacitance 100 is preferably selected such that its value is less than around 10% of the total value and capacitance 105 is selected such that its value is around 90% or less of the total value. Thus, in our example, capacitance 100 may be about 50 µF and capacitance 105 may be around 3600 µF.

During a hot insertion event, power supply 70 may prevent drawing a large amount of current from other power supplies that also are coupled to busses 40 and 45. Prior to being inserted into the system, power supply 70 will be off and capacitance 100 initially will be uncharged. Upon being inserted into the system, capacitance 100 will draw current from the busses 40 and 45. By choosing the capacitance 100 on power supply 70 to be small compared to capacitance 105 on busses 40 and 45, the rate of current draw for capacitance 100 may be controlled such that the voltage on busses 40 and 45 does not dip below a predetermined value, say 10%. For example, in a 12 volt bus voltage scenario, the maximum allowable swing may be +/− 10% or 1.2V. In some embodiments, the value of capacitance 100 is less than about 10% of the value of capacitance 105.

FIGS. 3B and 3C represent experimental results derived from implementing the embodiment shown in FIG. 3A with a 50 µF ceramic capacitor implemented for capacitance 100 and an 3600 µF capacitor implemented for capacitance 105. FIG. 3B depicts a hot insertion of power supply 70 with a load current of about 30 A. Referring to FIG. 3B, channel 1 represents the voltage on a bus, such as busses 40 or 45. The vertical scale for channel 1 in FIG. 3B is 500 mV/div with offset 10.0V, while the horizontal scale is 1 μS/div for all of the waveforms in FIG. 3B. Channel 2 represents a measurement of the current into capacitance 100 (measured as a voltage drop across a 0.833 mΩ measurement resistor). The vertical scale for channel 2 is 40 mV/div. Channel 3 represents the output voltage of a power supply, such as power supply 70, which is being inserted into the redundant power system. The vertical scale for channel 3 is 5 V/div. As can be appreciated from an inspection of FIG. 3B, a peak current of around 100 A conducts through capacitance 100 for less than 2 μS, resulting in a dip in the output voltage of around 400 mV, which is within the 10% limit. Thus, the embodiment shown in FIG. 3A allows the isolation device to be eliminated from power supply 70 while mitigating the current draw on system voltage bus upon hot insertion.

The embodiment shown in FIG. 3A also may mitigate the effects of a hot extraction that result from elimination of the isolation device, as illustrated in FIG. 3C. One particular risk of hot extraction is that there will be a momentary arcing as the power supply is extracted, especially when the physical air gap between the power supply and the voltage bus is relatively small. By implementing the embodiment depicted in FIG. 3A, the current stored in inductor 95 will flow through capacitance 100 as power supply 70 is extracted, instead of flowing through the physical air gap between power supply 70 and busses 40 and 45. This current path is indicated by the dashed arrow in FIG. 3A. In some embodiments in which arcing is eliminated in this manner, the value of the inductor is between about 1-10 μH and the value of capacitance is between about 50-100 μF.

FIG. 3C depicts hot extraction of power supply 70 with a load current of about 15 A. Referring to FIG. 3C, channel 1 represents the voltage on a bus, such as bus 40. The vertical scale for channel 1 in FIG. 3C is 500 mV/div with offset 10V, while the horizontal scale is 200 μS/div for all of the waveforms in FIG. 3C. Channel 2 represents a measurement of the current out of power supply 70 as measured by a "clamp on" meter available from Tektronics Corporation. The vertical scale for channel 2 is 10 A/Div. Channel 3 represents the output voltage of a power supply, such as power supply 70, which is being extracted from the redundant power system. (Note that the time scale shown in FIG. 3C is small enough that the output voltage of channel 3 appears to be maintained, however, in practice this voltage will decay to zero as capacitance 100 discharges). The vertical scale for channel 3 is 5V/div. As can be appreciated from an inspection of FIG. 3C, the output voltage on channel 3 does not over-shoot and the output current on channel 2 is also falling because the power supply is being extracted. Importantly, the bus voltage on channel 1 remains substantially the same with a dip of less than 200 mV. Thus, the embodiment shown in FIG. 3A allows the isolation device to be eliminated from power supply 70 while reducing arcing between the power supply and the system voltage bus upon hot extraction.

As mentioned previously, removing isolation devices (according to the various embodiments) may make it difficult to detect which power supply, among the many that may be coupled to the voltage bus, is causing an over voltage condition. FIG. 4 depicts another embodiment of a removable power supply 150 that may be used to detect and mitigate an over voltage condition.

Power supply 150 includes a sampling diode 155, with its anode connected to the cathode terminals of rectifying diodes 90. The cathode terminal of sampling diode 155 is coupled to gain stage 160 through a resistor 165. A second resistor 170 forms a resistor divider circuit with resistor 165, and a capacitance 175 is coupled in parallel with resistor 170. The output of gain stage 160 is coupled to a power supply control circuit 180. Although not shown in FIG. 4, a buffer may be implemented before gain stage 160 to isolate noise from power supply 150.

During operation, sampling diode 155 may sample the voltage at the cathode terminals of rectifying diodes 90, which is labeled as node Z in FIG. 4. Note that the sampling performed by sampling diode 155 at node Z comes before inductor 95 and the output stage so that the sampled value at node Z is isolated from the output terminals of power supply 150. In this manner, sampling diode 155 may sample the condition of power supply 150 independent of the other power supplies that may be present in the system.

Further, inductor 95 couples directly to busses 40 and 45 and limits the amount of current that enters or exits power supply 150, where the precise amount of current limiting varies based on the value of inductor 95. By limiting the current, the voltage at node Z may begin to build up and cause control circuit 180 to trip and turn power supply 150 off. Since numerous power sources (such as power supply 150) may be coupled to busses 40 and 45, inductor 95 may provide isolation between these numerous power sources.

Additionally, sampling diode 155 may provide further isolation in that noise from control circuitry 180 or gain stage 160 is prohibited from traversing from the cathode to the anode of sampling diode 155. In other words, by virtue of the fact that sampling diode 155 should be forward biased to pass signals, when node Z is sufficiently above zero by this forward bias amount (e.g., 0.7 volts) signals traverse from node Z to control circuit 180.

The sampled voltage value from sampling diode 155 is resistor divided by resistors 165 and 170. In some embodiments, resistor 165 is ten times the size of resistor 170, for example, 100 kΩ and 10 kΩ respectively. Depending on the value of capacitor 175, it may either detect the peak or average sampled value from node Z. For example, if capacitor 175 is 4.7 μF, then the average value may be detected, whereas if capacitor 175 is 1000 pF, then the peak value of the signal from node Z will be detected.

In some embodiments, the peak value may be used instead of the average value. For example, if the tolerances of the overall system are such that a quick response to power supply variations are desired, then peak values may be used. On the other hand, if tolerances are configured that quick response to power supply variations are not necessary, then average values may be used.

In addition to gain stage 160 being coupled to node Z through resistor 165, gain stage 160 is coupled to a reference voltage $V_{ref}$. Based on comparing $V_{ref}$ to the voltage across capacitor 175 (i.e., the average or peak value sampled at node Z) gain stage 160 may actuate control circuit 180 to turn power supply 150 on and off based on this comparison. Thus, in the event of an over voltage condition at the outputs of power supply 150, control circuitry 180 may turn power supply 150 off.

Note that the monitoring and disabling of power supply 150 does not involve isolation devices in the same path that the supply current is flowing. As a result, circuitry 180 has the ability to provide isolation capability to power supply 150 without consuming as much power as the traditional isolation schemes shown in FIGS. 3A and 3B. Additionally, signal diodes (such as the MMBD7000LT1 available from On Semiconductor) may be used instead of the high power diodes (such as diode 50) that are traditionally used for rectifying the power signals. Generally, these signal diodes have a much lower current rating, for example, 1 A compared to 80-100 A of the traditional high power diodes.

In the event that sampling diode 155 (shown in FIG. 4) is eliminated altogether, the value of resistor 165 may be chosen with a high enough value such that resistor 165, along with inductor 95, isolate noise from control circuitry 180 from trickling back into the output terminals of power supply 150 and also isolate noise from front end 75 and transformer 85 from polluting sampling circuitry. For example, resistor 165 may be 100 kΩ in these embodiments.

FIG. 5 represents an alternative embodiment of power supply 150 that couples the anode terminals of two sampling diodes 190 (such as the MMBD7000LT1 available from On Semiconductor) to transformer 85. Again, because sampling diodes 190 are implemented outside of the current path, the power consumption is less than the traditional isolation schemes shown in FIGS. 3A and 3B.

The above discussion is meant to be illustrative of the principles and various embodiments of the present invention. Numerous variations and modifications will become apparent to those skilled in the art once the above disclosure is fully appreciated. For example, although resistors and capacitances may be described and represented as single devices, one of ordinary skill in the art would appreciate that these resistors and capacitances actually may be implemented with multiple devices that are arranged in a binary-weighted arrangement. It is intended that the following claims be interpreted to embrace all such variations and modifications.

What is claimed is:

1. A constituent power supply capable of being inserted into a redundant voltage bus, the power supply comprising:
   a transformer;
   a plurality of rectifying diodes coupled to the transformer;
   an inductor coupled to the rectifying diodes and also coupled to an output terminal of the power supply;
   at least one sampling diode coupled to the rectifying diodes; and
   an internal capacitance coupled across the output terminals of the power supply wherein the internal capacitance has a value that is less than an external capacitance that is coupled to the redundant voltage bus.

2. The power supply of claim 1, wherein the value of the internal capacitance is chosen to match the value of the inductor.

3. The power supply of claim 2, wherein the value of the internal capacitance is substantially smaller than the external capacitance such that discharging of the redundant voltage bus is limited.

4. The power supply of claim 3, wherein the value of the internal capacitance is less than about 10% of the total value of the internal and external capacitances.

5. The power supply of claim 4, further comprising a transistor coupled to the output resistor, wherein the transistor is capable of shorting out the output resistor to modify the rate of current draw from the voltage bus by the power supply.

6. The power supply of claim 5, wherein the transistor is controlled by a timer circuit that operates as a function of the output voltage of the power supply.

7. The power supply of claim 1, wherein the total value of the internal and external capacitances is selected based on the noise present on the redundant voltage bus.

8. The power supply of claim 1, further comprising an output resistor serially coupled to the internal capacitance, wherein the combination of the internal capacitance and the output resistor is coupled across the output terminals of the power supply such that the output resistor limits the amount of current draw when the power supply is inserted into the redundant voltage bus.

9. A constituent power supply capable of being inserted into a redundant voltage bus, the power supply comprising:
   a transformer;
   a plurality of rectifying diodes coupled to the transformer;
   an inductor coupled to the rectifying diodes and also coupled to an output terminal of the power supply;
   a sampling circuit coupled to the rectifying diodes through at least one sampling diode;
   a control circuit coupled to the sampling circuit, wherein the control circuit turns off the power supply based on signals from the sampling circuit; and
   a capacitor serially coupled to a resistor, wherein the combination of the capacitor and resistor are coupled across the output terminals of the power supply such that the resistor limits the amount of current draw from the redundant voltage bus by the power supply.

10. The sampling circuit of claim 9, further comprising a resistor and capacitor coupled to the at least one sampling diode, wherein the value of the capacitor controls whether the at least one sampling diode samples either the peak voltage value or the average voltage value.

11. The power supply of claim 9, wherein the at least one sampling diode isolates is isolated from the output terminals of the power supply.

12. The power supply of claim 9, wherein the at least one sampling diode is coupled to the cathode terminals of the rectifying diodes.

13. The power supply of claim 9, wherein the at least one sampling diode conducts substantially less current than the rectifying diodes.

14. The power supply of claim 9, wherein the at least one signaling diode is coupled to the anode terminals of the rectifying diodes.

15. A computer system comprising:
   a central processing unit (CPU);
   a redundant power supply coupled to the CPU and comprising a plurality of constituent power supplies, each constituent power supply comprising:
   a transformer;
   a plurality of rectifying diodes coupled to the transformer;
   an inductor coupled to the rectifying diodes and also coupled to an output terminal of the power supply;
   at least one sampling diode coupled to the rectifying diodes; and
   an internal capacitance coupled across the output terminals of the constituent power supply wherein the internal capacitance has a value that is less than an external capacitance that is coupled to the redundant power supply.

16. The power supply of claim 15, wherein the ratio between the value of internal capacitance and the value of the external capacitance is 1:10.

17. A constituent power supply capable of being inserted into a redundant voltage bus, the power supply comprising:
   a transformer;
   a plurality of rectifying diodes coupled to the transformer;
   an inductor coupled to the rectifying diodes and also coupled to an output terminal of the power supply without an intervening isolation device; and
   a means for mitigating the effects of eliminating the isolation device.

18. The constituent power supply of claim 17, wherein the means for mitigating the effects of eliminating the isolation device comprises at least one signaling diode that is coupled to the plurality of rectifying diodes.

19. The constituent power supply of claim 17, wherein the means for mitigating the effects of eliminating the isolation device comprises an internal capacitance coupled across the output terminals of the constituent power supply wherein the internal capacitance has a value that is less than an external capacitance that is coupled to the redundant voltage bus.

20. A method of constructing a power supply, comprising:
providing a transformer;
coupling a plurality of rectifying diodes to the transformer;
coupling an inductor to the rectifying diodes;
coupling the inductor to an output terminal of the power supply;
coupling an internal capacitance across the output terminals of the constituent power supply wherein the internal capacitance has a value that is less than an external capacitance that is coupled to a redundant voltage bus.

21. The method of claim 20, further comprising selecting the value of the internal capacitance to match the value of the inductor.

22. The method of claim 21, further comprising isolating a control circuit from the rectifying diodes using at least one sampling diode.

23. The method of claim 22, further comprising turning the constituent power supply on and off based on the output of the control circuit.

* * * * *